(12) United States Patent
Kim et al.

(10) Patent No.: US 7,586,701 B2
(45) Date of Patent: Sep. 8, 2009

(54) ACTUATOR FOR MOBILE DEVICE

(75) Inventors: Sung Hoon Kim, Suwon (KR); Oh Byoung Kwon, Suwon (KR); Jang Young Im, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 12/000,337

(22) Filed: Dec. 11, 2007

(65) Prior Publication Data

US 2008/0144200 A1  Jun. 19, 2008

(30) Foreign Application Priority Data

Dec. 13, 2006 (KR) ................ 10-2006-0127312

(51) Int. Cl.
*G02B 7/021* (2006.01)
(52) U.S. Cl. ............ 359/824; 359/814; 369/44.16; 369/112.2
(58) Field of Classification Search ........ 359/811, 359/813, 814, 819, 823, 824; 369/13.22, 369/30.17, 32, 34, 44.11, 44.14–44.16, 44.27, 369/44.29, 44.34, 112.2, 116, 135; 250/201.5; 396/439
See application file for complete search history.

(56) References Cited

U.S. PATENT DOCUMENTS

| | | | | |
|---|---|---|---|---|
| 5,206,849 A | * | 4/1993 | Yamamoto et al. | 369/44.16 |
| 6,087,644 A | * | 7/2000 | Schell | 250/201.5 |
| 6,594,223 B2 | * | 7/2003 | Suzuki et al. | 720/683 |
| 6,741,529 B1 | * | 5/2004 | Getreuer | 369/30.17 |
| 7,324,412 B2 | * | 1/2008 | Im et al. | 369/44.15 |
| 2006/0275032 A1 | | 12/2006 | Hong et al. | 396/439 |

FOREIGN PATENT DOCUMENTS

| | | |
|---|---|---|
| JP | 2001-351257 | 12/2001 |
| JP | 2004-280031 | 10/2004 |
| JP | 2006-293243 | 10/2006 |
| KR | 10-2006-0125236 | 12/2006 |
| WO | 2006/126545 | 11/2006 |

OTHER PUBLICATIONS

Search and Examination Report issued in corresponding UK Patent Application No. GB0723816.5; dated Apr. 4, 2008.

* cited by examiner

*Primary Examiner*—Loha Ben

(57) ABSTRACT

Provided is an actuator for a mobile device including a holder having a coil wound along inner side surfaces thereof; a driving unit that is inserted into the holder such that four side surfaces of the driving unit are spaced at a predetermined distance from side walls of the holder, the driving unit having magnets coupled to the respective side surfaces thereof; a pair of suspension wires that are mounted symmetrically with each other on the upper portion of the driving unit such that an arbitrary portion of each suspension wire is bent and directed toward a corner of the driving unit; and a pair of support plates that are coupled to both lower sides of the driving unit such that elastic forces are generated in opposite directions to each other.

10 Claims, 5 Drawing Sheets

[FIG. 1]
(PRIOR ART)
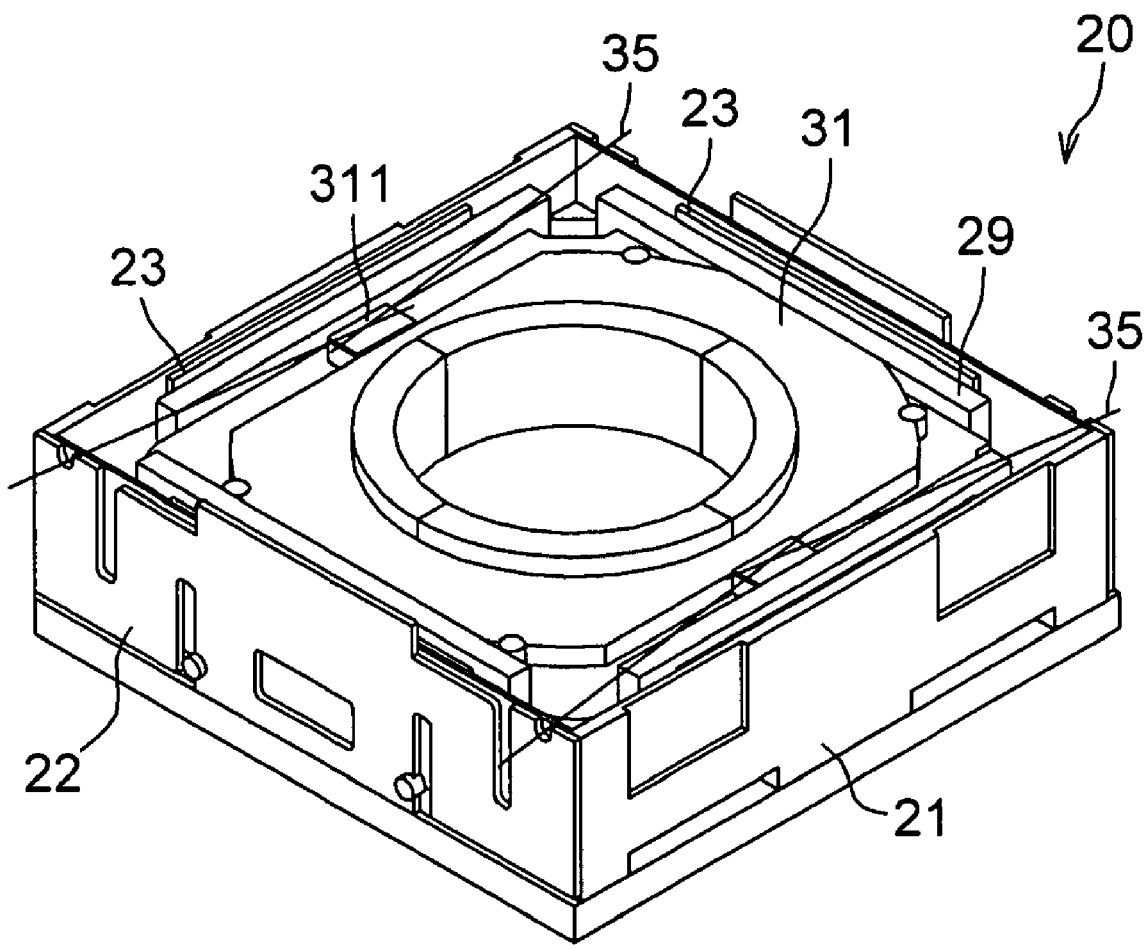

[FIG. 2]
(PRIOR ART)
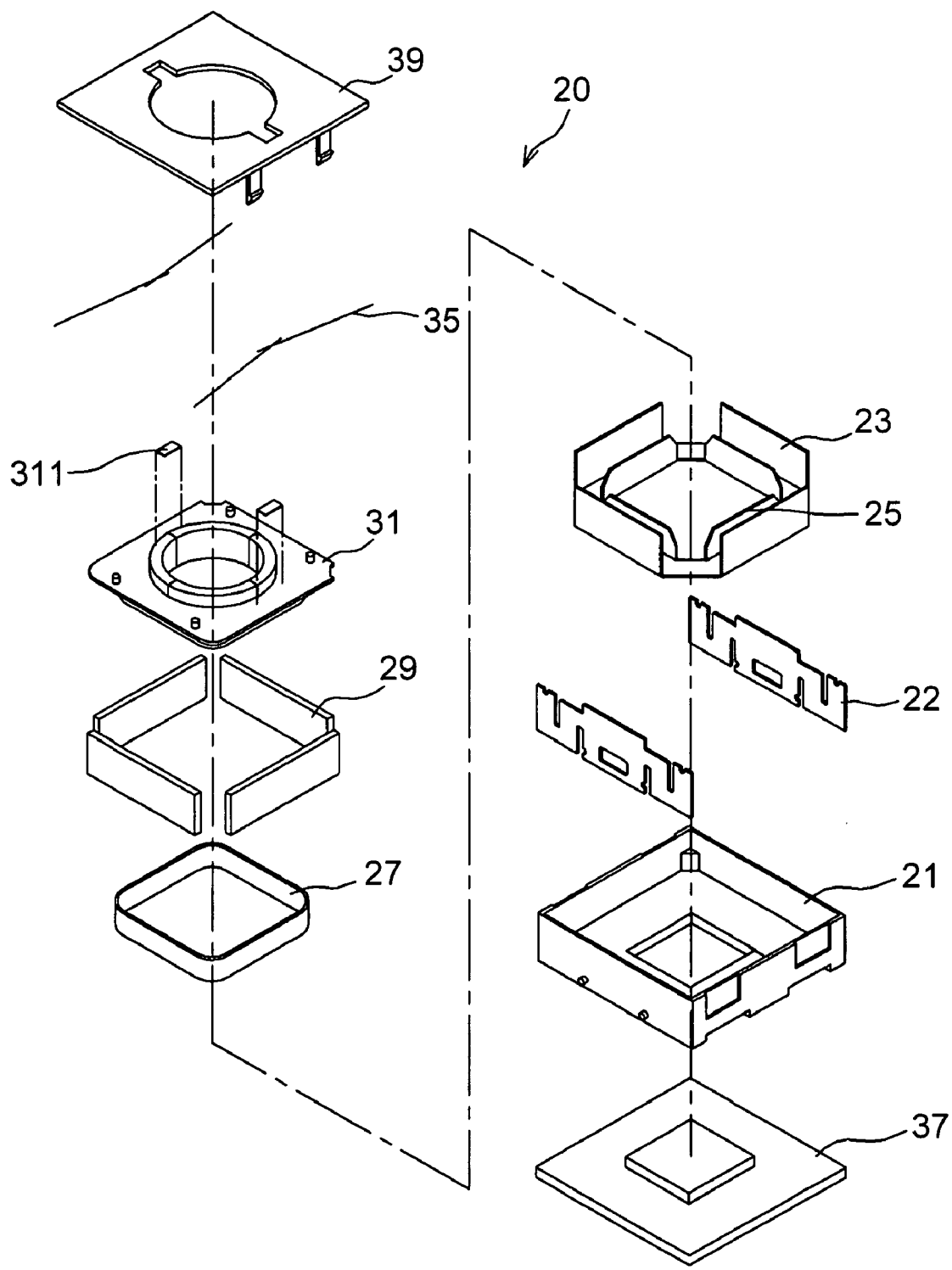

[FIG. 3]
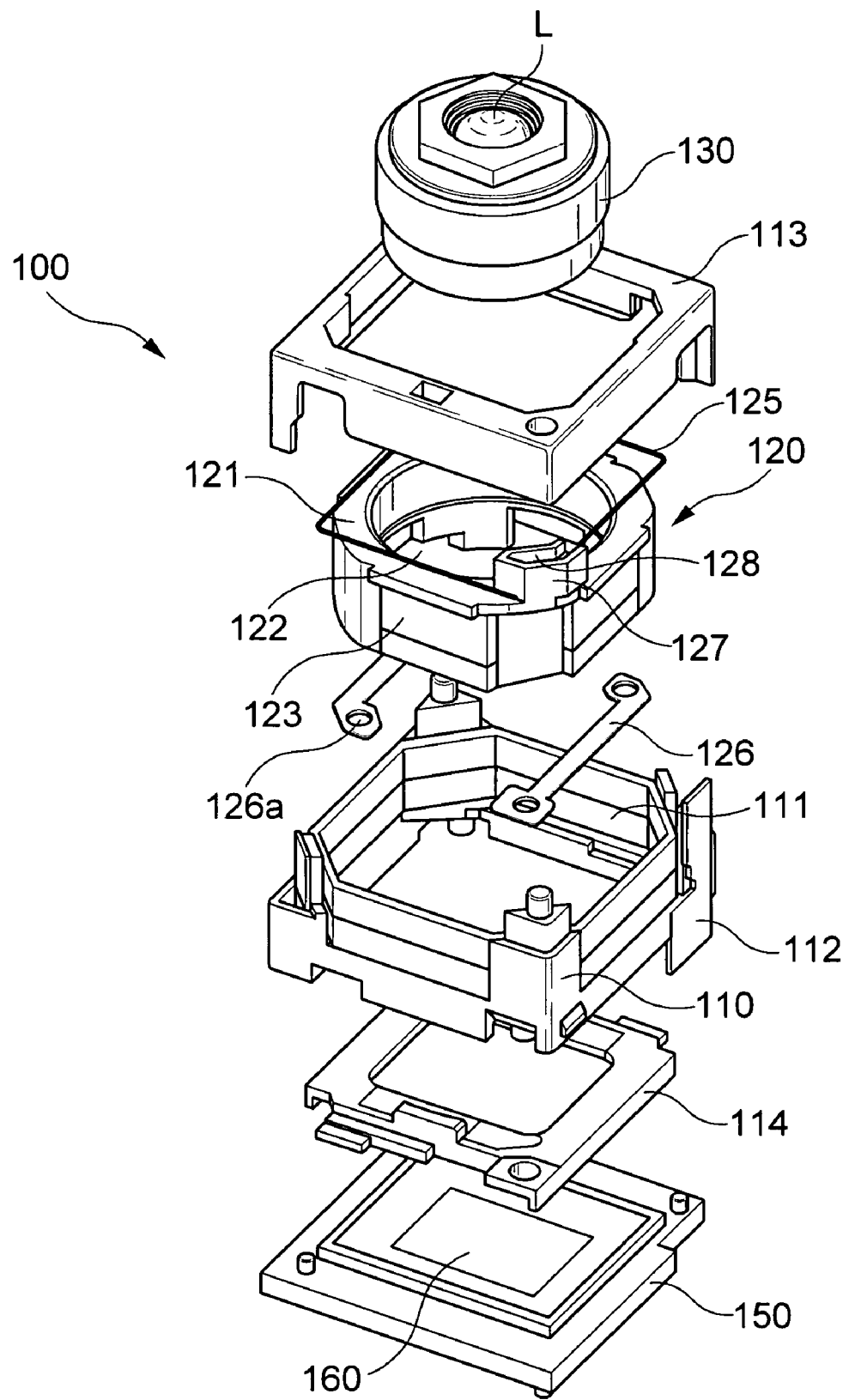

[FIG. 4]
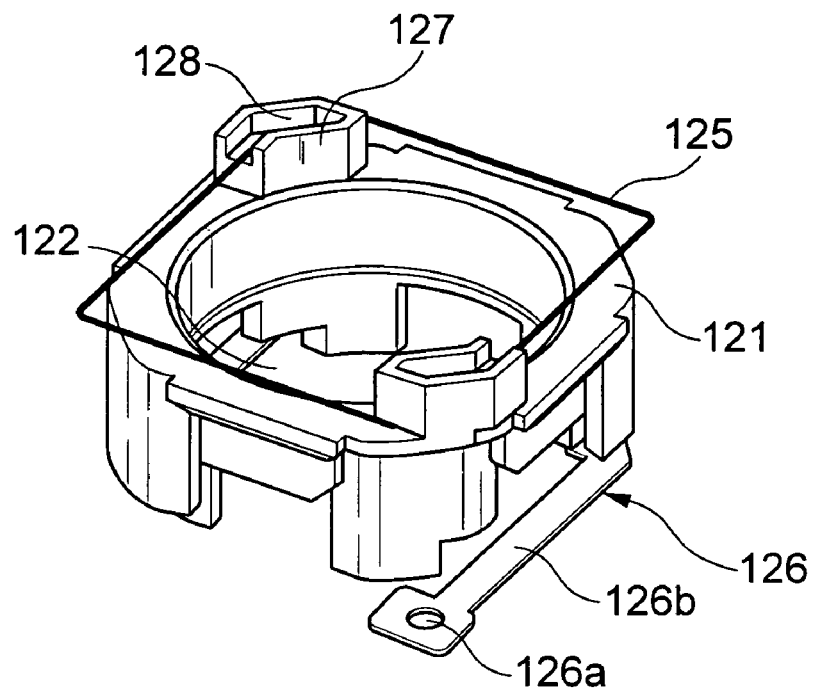
[FIG. 5]
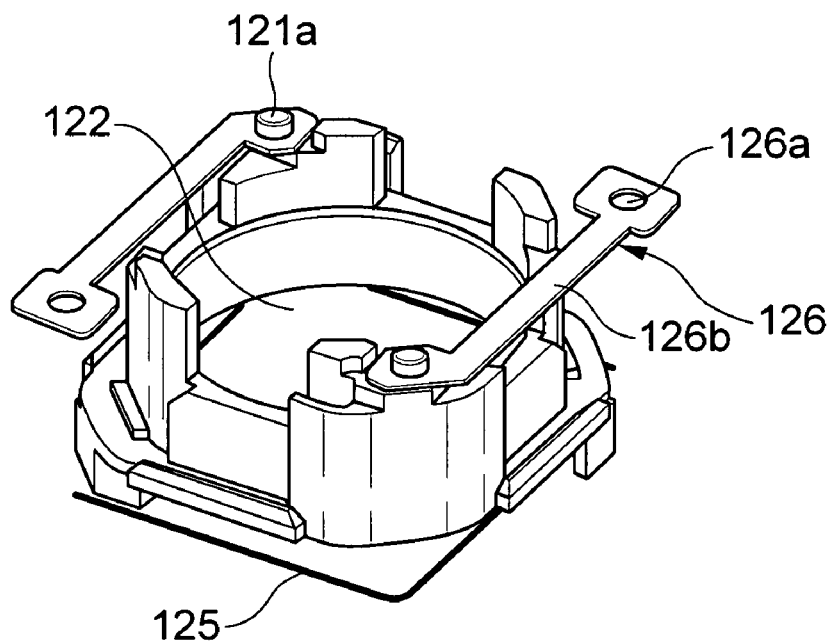

[FIG. 6]
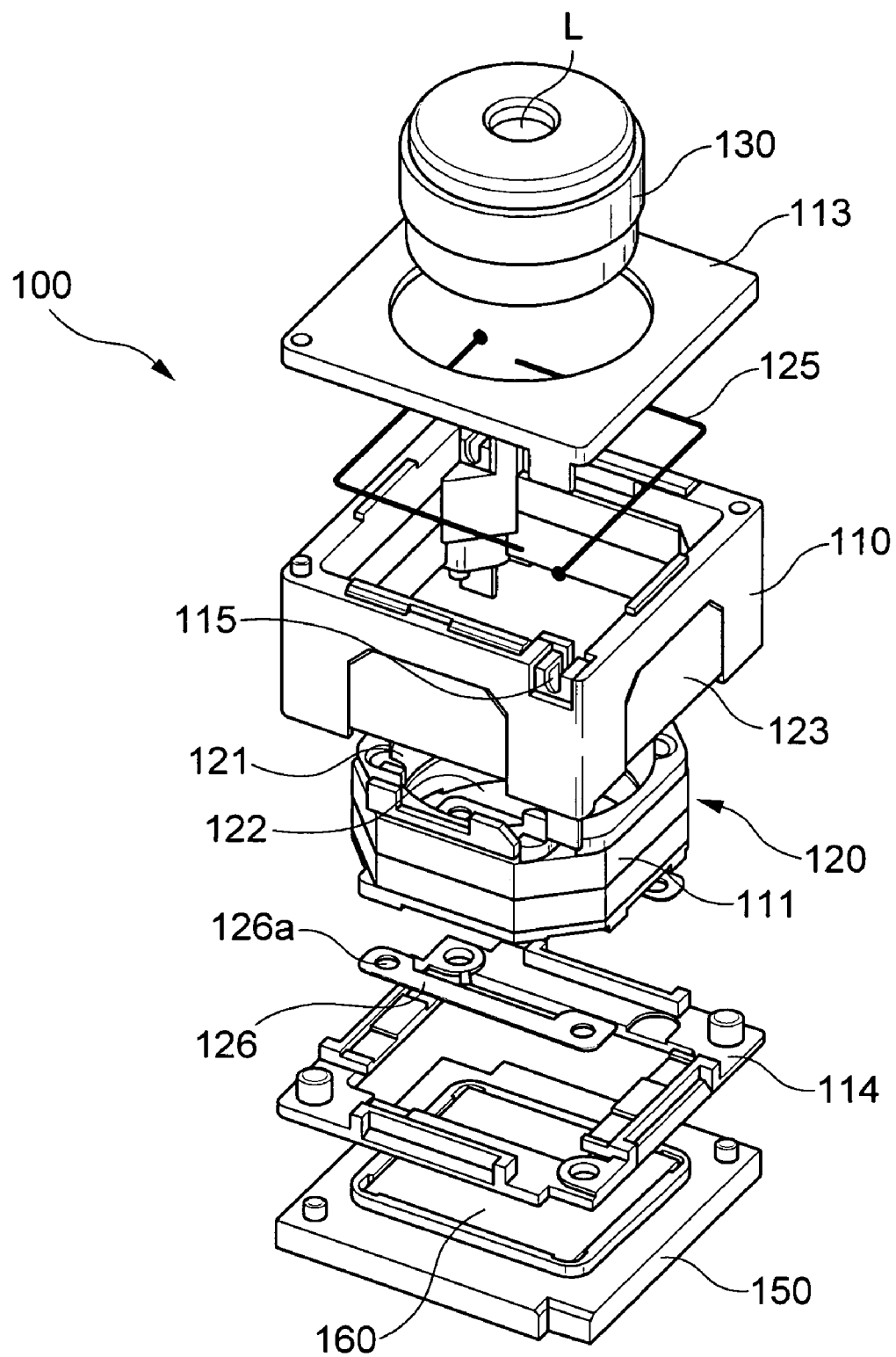

ACTUATOR FOR MOBILE DEVICE

CROSS-REFERENCE TO RELATED APPLICATIONS

This application claims the benefit of Korean Patent Application No. 10-2006-0127312 filed with the Korea Intellectual Property Office on Dec. 13, 2006, the disclosure of which is incorporated herein by reference.

BACKGROUND OF THE INVENTION

1. Field of the Invention

The present invention relates to an actuator for a mobile device, which can enhance a sensitivity characteristic and prevent a tilt of a driving unit caused by a difference in flux density.

2. Description of the Related Art

Recently, camera-integrated mobile terminals such as mobile phones or personal digital assistants (PDAs) are launched on the market. Further, consumers also demand such mobile terminals having a camera with a high pixel resolution and various functions. In such a camera, a lens is attached on an imaging element such as a charge coupled device (CCD) or complementary metal oxide semiconductor (CMOS) so as to image an object, and data of the imaged object is recorded into a predetermined recording medium.

With the recent development of mobile terminals such as portable phones and personal digital assistants (PDAs), the mobile terminals provide a phone call function and are used as multi-convergence devices. The most representative of the multi-convergence devices is a camera module. The resolution of the camera module changes from 300,000 pixels (VGA) to 8,000,000 pixels. Moreover, the camera module provides various additional functions, such as auto-focusing (AF) and optical zoom.

In particular, a demand for mobile terminals having a camera module provided with an auto-focusing function rapidly increases, because the camera module can provide a high-quality image in which focusing is achieved regardless of a focal distance from an object. However, in such a camera module with various functions as well as the auto-focusing function, the number of built-in parts increases. Therefore, the overall size of the camera module inevitably increases, compared with that of a general camera module.

Accordingly, there are difficulties in assembling such a camera module into a mobile terminal.

To overcome such a problem and provide an auto-focusing function to small-sized optical devices, a voice-coil-motor (VCM) type actuator is frequency used, in which a driving unit having a lens module mounted therein is vertically driven by an electromagnetic force generated by an interaction between an electric field generated by a magnet and a magnetic field generated by a coil, thereby performing auto-focusing.

FIGS. 1 and 2 are a perspective view and exploded perspective view of a conventional VCM-type actuator for a mobile device, which has been disclosed in Korea Patent Application No. 2005-47170 filed by the present inventor. Now, the structure and problem of the conventional actuator will be described.

As shown in FIGS. 1 and 2, the conventional actuator 20 for a mobile device includes a holder 21, outer and inner yokes 23 and 25 which are mounted in the holder 21, a coil 27 interposed between the outer and inner yokes 23 and 25, a bobbin 31 coupled to the coil 27 and having a lens module provided therein, a pair of holder PCBs (printed circuit board) 22 which are boned and coupled to both sides of the holder 21, and a pair of suspension wires 35 of which both ends are bonded and electrically connected to the respective holder PCBs 22, the suspension wires 35 being formed in an X shape.

The coil 27 is wound around the outer circumferential surface of the bobbin 31 so as to be disposed inside magnets 29. The bobbin 31 is vertically transferred by an electromagnetic force generated between the coil 27 and the magnets 29.

Each of the holder PCBs 22 coupled to the holder 21 has a predetermined circuit pattern formed thereon, and a current applied from outside through the circuit pattern is applied to the suspension wires 35 coupled to the upper portions of the holder PCBs 22.

The suspension wires 35 formed in an X shape are elastically coupled to both sides of the upper surface of the bobbin 31, while being disposed symmetrically with each other.

The conventional actuator 20 for a mobile device constructed in such a manner can be maintained horizontally, because the suspension wires 35 are disposed symmetrically with each other in both sides of the upper surface of the bobbin 31. Then, only when the bobbin 31 is vertically transferred, a tilt of the bobbin 31 can be prevented.

Further, since the suspension wires 35 are used instead of a typically-used plate spring which is difficult to process, a manufacturing process is simple, and a manufacturing cost can be reduced. However, since the suspension wires 35, which elastically pressurize the bobbin 31 which is vertically driven by the electromagnetic force inside the holder 21, support only the upper portion of the bobbin 31, a posture difference of the actuator 20 may occur. More specifically, when the actuator 20 is vertically maintained, the bobbin 31 droops downward inside the holder 21 due to the weight thereof. Therefore, when the actuator 20 has a posture tilted at a predetermined angle, the bobbin 31 is inevitably tilted.

Accordingly, a distance between the magnet 29 and the coil 27 decreases in a side where the bobbin 31 is tilted, and increases in the opposite side. In this state, when the bobbin 31 is driven by applying a voltage to the actuator 20, the bobbin 31 is further tilted by the posture difference.

In the conventional actuator 20 for a mobile device, it is advantageous that the effective length of the suspension wires 35 is enlarged, in order to enhance a sensitivity characteristic of the suspension wires 35. However, as the effective length of the suspension wires 35 increases, it is difficult to reduce the size of the actuator 20. Therefore, there is a limit in enlarging the effective length of the suspension wires 35.

Further, in order to electrically connect the suspension wires to the holder PCBs 22, a soldering process of the suspension wires 35 is added. In this case, a defect occurrence rate may increase because of flux or foreign matters generated during the soldering process.

SUMMARY OF THE INVENTION

An advantage of the present invention is that it provides an actuator for a mobile device, in which a pair of suspension wires, of which arbitrary portions are bent, and a pair of support plates are respectively mounted on and under a driving unit including a bobbin having a lens unit mounted therein. Therefore, it is possible to minimize the occurrence of tilt of the bobbin when the actuator is driven, and to enhance a sensitivity characteristic of the suspension wires, thereby minimizing power consumption.

Additional aspects and advantages of the present general inventive concept will be set forth in part in the description which follows and, in part, will be obvious from the description, or may be learned by practice of the general inventive concept.

According to an aspect of the invention, an actuator for a mobile device comprises a holder having a coil wound along inner side surfaces thereof; a driving unit that is inserted into the holder such that four side surfaces of the driving unit are spaced at a predetermined distance from side walls of the holder, the driving unit having magnets coupled to the respective side surfaces thereof; a pair of suspension wires that are mounted symmetrically with each other on the upper portion of the driving unit such that an arbitrary portion of each suspension wire is bent and directed toward a corner of the driving unit; and a pair of support plates that are coupled to both lower sides of the driving unit such that elastic forces are generated in opposite directions to each other.

According to another aspect of the invention, an actuator for a mobile device comprises a holder having magnets mounted on inner side surfaces thereof; a driving unit that is inserted into the holder such that four side surfaces of the driving unit are spaced at a predetermined distance from side walls of the holder, the driving unit having a coil wound along the respective side surfaces thereof; a pair of suspension wires that are mounted symmetrically with each other on the upper portion of the holder such that an arbitrary portion of each suspension wire is bent and directed toward a corner of the holder; and a pair of support plates that are coupled to both lower sides of the driving unit such that elastic forces are generated in opposite directions to each other.

Preferably, the upper and lower portions of the holder are covered by upper and lower holder lids, respectively.

The actuator further comprises a casing that is coupled to surround side surfaces of the holder; and a sensor housing that has an image sensor mounted in the central portion thereof and is closely coupled to the lower portion of the holder.

Preferably, the driving unit includes a bobbin which has a lens unit mounted in the central portion thereof and a wire fixing portion formed on each of two upper corners thereof which diagonally face each other, the wire fixing portion having a fixing groove provided therein, and the magnets are coupled to outer surfaces of the bobbin.

Preferably, each of the suspension wires has one end fixed to the fixing groove of the bobbin and the other end serving as a free end parallel to one side of the bobbin such that elasticity is provided to the free end.

The suspension wire may be bent in an L shape. Further, the suspension wire may be formed in a rectangular shape or U shape.

Preferably, each of the support plates has a body formed of a thin plate with elasticity and is mounted in such a manner that the body is exposed in a wing shape to either side of the bobbin.

Preferably, the support plate has one end coupled to a projection formed on the bobbin, and the body of the support plate extending toward the other end is closely attached to the bottom surface of the holder.

Preferably, the holder has a fixing groove formed on each of two upper corners thereof, which diagonally face each other, such that one end of each suspension wire of which the central portion is bent is boned and fixed to the fixing groove.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIGS. 1 and 2 are a perspective view and exploded perspective view of a conventional VCM-type actuator for a mobile device;

FIG. 3 is an exploded perspective view of an actuator for a mobile device according to an embodiment of the invention;

FIG. 4 is a perspective view of a driving unit adopted in the actuator for a mobile device;

FIG. 5 is a perspective bottom view of the driving unit adopted in the actuator for a mobile device; and FIG. 6 is a perspective view of an actuator for a mobile device according to another embodiment of the invention.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Hereinafter, embodiments of the present invention will be described in detail with reference to the accompanying drawings.

FIG. 3 is an exploded perspective view of an actuator for a mobile device according to an embodiment of the invention. FIG. 4 is a perspective view of a driving unit adopted in the actuator for a mobile device. FIG. 5 is a perspective bottom view of the driving unit adopted in the actuator for a mobile device.

As shown in the drawings, the actuator 100 for a mobile device according to the invention is a moving magnet type actuator in which a bobbin 121 having magnets 123 mounted thereon is vertically transferred inside a holder 110. The actuator 100 includes the holder 110, a coil 111 wound along inner side surfaces of the holder 110, a driving unit 120 inserted into the holder 110, a pair of suspension wires 125, a pair of support plates 126, and a upper holder lid 113 which covers the upper portion of the driving unit 120. The suspension wires 125 and the support plates 126 are respectively mounted on and under the driving unit 120.

In the actuator 100, a lens unit 130 having at least one or more lenses L stacked therein is inserted from the upper side and mounted into the bobbin 121 composing the driving unit 120. Further, a casing is coupled to the outer surface of the holder 110 so as to surround the four sides of the holder 110, and a sensor housing 150 having an image sensor 160 mounted thereon is closely coupled to the lower portion of the holder 110.

The holder 110, of which the upper and lower portions are opened, has a predetermined space formed therein such that the bobbin 121 can be mounted in the space. Further, the holder 110 has the coil 111 wound along the inner side surfaces thereof. In addition, the holder 110 has upper and lower holder lids 113 and 114 coupled to the upper and lower portions thereof, respectively.

The driving unit 120 has a polar or non-polar magnet 123 mounted on each outer wall surface thereof.

The bobbin 121 of the driving unit 120 having the magnet 123 coupled to each outer wall surface thereof is housed in the internal space of the holder 110. In this case, the bobbin 121 is mounted in such a manner that the four side surfaces thereof are spaced at a predetermined distance from the side walls of the holder 110.

Therefore, the magnet 123 and the coil 111 are spaced at a predetermined distance from each other. The magnet 123 is mounted on each outer side surface of the bobbin 121, and the coil 111 is wound along the inner side surfaces of the holder 110 such that the magnet 123 and the coil face each other.

In the driving unit 120 which is inserted in such a manner that the four side surfaces thereof are spaced from the side walls of the holder 110, the bobbin 121 has a through-hole 122 formed in the center thereof, through which the lens unit 130 is inserted, and the magnet 123 is coupled to each side surface of the bobbin 121. The bobbin 121 is vertically driven inside the holder 110 by a driving force generated by an interaction between the magnet 123 and the coil 111, that is, an electromagnetic force.

In this case, the magnet 123 is vertically coupled to each side surface of the bobbin 121 through a yoke (which is provided on the inner surface of the magnet).

Further, the suspension wires 125 and the support plates 126 coupled to the upper and lower portions of the bobbin 121, respectively, elastically pressurize motions of the bobbin 121 so as to limit the vertical transfer range of the bobbin 121 inside the holder 110, and simultaneously prevent side-to-side motions of the bobbin 121 so as to minimize a tilt when the bobbin 121 is driven.

The central portion of each suspension wire 125 is bent in such a manner that one end of the suspension wire 125 is coupled to a wire fixing portion 127 formed on each of two upper corners of the bobbin 121 which diagonally face each other. The wire fixing portion 127 has a fixing groove 128 provided therein. One end of the suspension wire 125 is bonded and coupled into the fixing groove 128, and the other end thereof serves as a free end which can secure elasticity.

Therefore, the suspension wire 125, of which the one end is bonded to each of the two upper corners of the bobbin 121, elastically supports the upper portion of the bobbin 121 mounted in the holder 110 by using the elasticity of the free end thereof.

Further, the other end of the suspension wire 125, extending from the bent portion thereof, is formed with a free end parallel to one side of the bobbin 121. Therefore, the upper portion of the bobbin 121 is elastically supported by the elasticity provided to the free end.

The suspension wire 125 may be formed in a rectangular shape or U shape as well as an L shape such that a free end is provided on the surface corresponding to the upper portion of the bobbin 121.

Preferably, the suspension wire 125 is formed of a material with an elastic force. For example, a wire composed of beryllium, copper or a brass-based alloy is mainly used.

The thinner the thickness of the suspension wire 125, the better the sensitivity thereof. However, when the bobbin 121 is moved left and right by an external impact or the like, the bobbin 121 may be tilted because a supporting force is reduced. Further, as the diameter of the suspension wire 125 increases, the sensitivity characteristic thereof is reduced, so that power consumption for driving the bobbin 121 increases. Therefore, the diameter of the suspension wire 125 should be properly adjusted depending on the size and performance of the bobbin 121.

Meanwhile, the suspension wire 125, of which one end is coupled to the wire fixing portion 127 of the bobbin 121, is reliably fixed by the bonding through the fixing groove 128 of the wire fixing portion 127.

The coil 111 is wound along the inner surfaces of the holder 110, that is, surfaces corresponding to the magnets 123 coupled to the bobbin 121 such that an electric field is generated by a current applied through an electrode 112 connected to the coil 111. At this time, a magnetic field is generated by the magnets 123 mounted on the surfaces corresponding to the coil 111. Then, the bobbin 121 is driven by an electromagnetic force generated by an interaction between the magnetic field and the electric field.

As such, the bobbin 121, driven by the magnet 123 and the coil 111 to which power is applied, is moved inside the holder 110 by the electromagnetic force generated by the coil 111 and the magnet 123, in a state where the lens unit 130 is mounted in the center of the bobbin 121. Therefore, while the driving force of the bobbin 121 is balanced with the elastic force of the suspension wire 125 which pressurizes the upper portion of the bobbin 121 with a predetermined elastic force, lens focusing is adjusted.

In this case, when the driving force for vertically transferring the bobbin 121 is generated through the coil 111 and the magnet 123, the bobbin 121 may be tilted or rotated toward a side where the electromagnetic force is not generated.

In particular, when the bobbin 121 is not at a level with the holder 110, that is, when the holder 110 is tilted at a predetermined angle, the rotation angle of the bobbin 121 with respect to a line of electromagnetic force generated between the coil 111 and the magnet 123 increases due to the weight of the bobbin 121.

To prevent such a problem, the pair of support plates 126 are mounted in such a manner that one end of each support plate 126 is closely coupled to the lower portion of the bobbin 121 and the other end thereof is closely attached to the upper surface of the upper holder lid 113.

Each of the support plates 126 is formed of a thin plate with a predetermined elasticity and has a through-hole 126a formed in one side thereof. As the through-hole 126a is coupled to a projection 121a formed on the lower portion of the bobbin 121, a body 126b of the support plate 126 is mounted so as to be exposed in a wing shape to either side of the bobbin 121.

The support plates 126 are symmetrically coupled in such a manner that the mounting portions of the bodies 126b on the holder 110 are directed to opposite directions to each other. The bodies 126b of the support plates 126 are supported by the top surface of the lower holder lid 114.

Therefore, although a posture difference occurs when the holder 110 is maintained at an angle where it deviates from a horizontal state, the tilt or rotation of the bobbin 121 caused by the weight thereof is prevented, because the pair of support plates 126 coupled to the lower portion of the bobbin 121 are closely attached to the bottom surface of the lower holder lid 114 at all times.

Further, since the coupling portions of the support plates 126 with the holder 110 are formed to extend in opposite directions to each other, elastic forces generated in the support plates 126 also act in opposite directions to each other. Therefore, regardless of the direction of the posture difference occurring in the holder 110, the bobbin 121 can be supported.

In the actuator 100 where the bobbin 121 is inserted into the holder 110, the casing (not shown) is coupled through the upper portion of the upper holder lid 113, and the sensor housing 150, into which the image sensor 160 is housed through a central perforated portion thereof, is closely coupled to the lower portion of the holder 110. Further, a printed circuit board having the image sensor 100 is mounted on the bottom surface of the sensor housing 150. Then, the assembling of a camera module having an auto-focusing function is completed.

FIG. 6 is a perspective view of an actuator for a mobile device according to another embodiment of the invention. As shown in FIG. 6, the actuator 100 according to this embodiment is a moving coil type actuator in which a bobbin 121 having a coil 111 coupled thereto is vertically transferred inside a holder 110. The actuator 100 includes the holder 110, four magnets mounted on the four side walls of the holder 110, a driving unit 120 inserted into the holder 110, a pair of suspension wires 125 mounted on the holder 110, a pair of support plates 126 mounted under the driving unit 120, and a holder lid 113 which covers the upper portion of the driving unit 120.

In the actuator 100, a lens unit 130 having at least one or more lenses L stacked therein is inserted from the upper side and mounted into the bobbin 121 composing the driving unit 120.

The holder 110, of which the upper and lower portions are opened, has a predetermined space formed therein such that the bobbin 121 is mounted in the space. Further, the holder 110 has a polar or non-polar magnet 123 mounted on each of the four side surfaces thereof.

The bobbin 121 having the coil 111 wound along side surfaces thereof is housed into the inner surface of the holder 110. In this case, the bobbin 121 inserted into the holder 110 is mounted in such a manner that the side surfaces thereof are spaced at a predetermined distance from side walls of the holder 110.

In the driving unit 120, the bobbin 121 has a through-hole 122 formed in the center thereof, through which the lens unit 130 is inserted, and the coil 111 is wound along the side surfaces of the bobbin 121. The bobbin 121 is vertically driven inside the holder 110 by a driving force generated by an interaction between the magnet 123 and the coil 111, that is, an electromagnetic force.

Like the above-described embodiment, the suspension wires 125 and the support plates 126, which are coupled to the upper portion of the holder 110 and the lower portion of the driving unit 120, respectively, elastically pressurize motions of the bobbin 121 so as to limit the vertical transfer range of the bobbin 121 inside the holder 110, and simultaneously prevent side-to-side motions of the bobbin 121 so as to minimize a tilt when the bobbin 121 is driven.

The central portion of each suspension wire 125 is bent in such a manner that one end of the suspension wire 125 is bonded and coupled to a fixing groove 115 formed on each of two upper corners of the holder 110 which diagonally face each other. Further, the other end of the suspension wire 125 serves as a free end which can secure elasticity.

Therefore, the suspension wire 125, of which the one end is bonded and coupled to each of the two upper corners of the holder 110, elastically supports the upper portion of the bobbin 121 mounted in the holder 110 by using the elasticity of the free end thereof.

Meanwhile, an electric field is generated by a current applied through an electrode (not shown) connected to the coil 111. At this time, while a magnetic field generated by the magnet 123 mounted on each of the side walls of the holder 110 corresponding to the coil 111 is transmitted, an electromagnetic force is generated by an interaction between the electric field and the magnetic field. Then, the bobbin 121 is driven by the electromagnetic force.

When the driving force for vertically transferring the bobbin 121 is generated through the coil 111 and the magnet 123, the bobbin 121 may be tilted or rotated toward a side where the electromagnetic force is not generated. To prevent such a problem, the pair of support plates 126 are mounted in such a manner that one end of each support plate 126 is closely coupled to the lower portion of the bobbin 121 and the other end thereof is closely attached to the top surface of the lower holder lid 114.

The support plates 126 are symmetrically coupled in such a manner that the bodies 126b of the support plates 126 are directed to opposite directions to each other. Further, the bodies 126b of the supports 126 are supported by the top surface of the lower holder lid 114.

According to the present invention, the suspension wires of which arbitrary portions are bent and the support plates with elasticity are mounted on and under the driving unit housed in the holder. Therefore, it is possible to minimize the occurrence of tilt caused by a posture difference of the actuator and the occurrence of tilt when the actuator is driven. Further, the sensitivity of the suspension wires is enhanced by the increased effective length of the suspension wires, thereby minimizing power consumption of the actuator.

Further, as the support plates are closely supported by the bottom surface of the holder, the tilt of the bobbin caused by a posture difference is prevented, and simultaneously, the tilt and rotation of the bobbin caused when the actuator is driven are prevented, which makes it possible to implement accurate auto-focusing.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An actuator for a mobile device, comprising:
 a holder having a coil wound along inner side surfaces thereof;
 a driving unit that is inserted into the holder such that four side surfaces of the driving unit are spaced at a predetermined distance from side walls of the holder, the driving unit having magnets coupled to the respective side surfaces thereof;
 a pair of suspension wires that are mounted symmetrically with each other on an upper portion of the driving unit such that an arbitrary portion of each suspension wire is bent and directed toward a corner of the driving unit; and
 a pair of support plates that are coupled to both lower sides of the driving unit such that elastic forces are generated in opposite directions to each other.

2. The actuator according to claim 1, wherein upper and lower portions of the holder are covered by upper and lower holder lids, respectively.

3. The actuator according to claim 1 further comprising:
 a casing that is coupled to surround side surfaces of the holder; and
 a sensor housing that has an image sensor mounted in a central portion thereof and is closely coupled to a lower portion of the holder.

4. The actuator according to claim 1, wherein the driving unit includes a bobbin which has a lens unit mounted in the central portion thereof and a wire fixing portion formed on each of two upper corners thereof which diagonally face each other, the wire fixing portion having a fixing groove provided therein, and the magnets are coupled to outer surfaces of the bobbin.

5. The actuator according to claim 4, wherein each of the suspension wires has one end fixed to the fixing groove of the bobbin and the other end serving as a free end parallel to one side of the bobbin such that elasticity is provided to the free end.

6. The actuator according to claim 5, wherein the suspension wire is bent in an L shape.

7. The actuator according to claim 4, wherein each of the support plates has a body formed of a thin plate with elasticity and is mounted in such a manner that the body is exposed in a wing shape to either side of the bobbin.

8. The actuator according to claim 7, wherein the support plate has one end coupled to a projection formed on the bobbin, and the body of the support plate extending toward the other end is closely attached to the bottom surface of the holder.

9. An actuator for a mobile device, comprising:
   a holder having magnets mounted on inner side surfaces thereof;
   a driving unit that is inserted into the holder such that four side surfaces of the driving unit are spaced at a predetermined distance from side walls of the holder, the driving unit having a coil wound along the respective side surfaces thereof;
   a pair of suspension wires that are mounted symmetrically with each other on an upper portion of the holder such that an arbitrary portion of each suspension wire is bent and directed toward a corner of the holder; and
   a pair of support plates that are coupled to both lower sides of the driving unit such that elastic forces are generated in opposite directions to each other.

10. The actuator according to claim 9, wherein the holder has a fixing groove formed on each of two upper corners thereof, which diagonally face each other, such that one end of each suspension wire of which the central portion is bent is boned and fixed to the fixing groove.

* * * * *